United States Patent
Baeuerle et al.

(10) Patent No.: US 9,354,948 B2
(45) Date of Patent: May 31, 2016

(54) DATA MODELS CONTAINING HOST LANGUAGE EMBEDDED CONSTRAINTS

(71) Applicants: Stefan Baeuerle, Walldorf (DE); Timm Falter, Walldorf (DE); Daniel Hutzel, Walldorf (DE); Lior Schejter, Walldorf (DE)

(72) Inventors: Stefan Baeuerle, Walldorf (DE); Timm Falter, Walldorf (DE); Daniel Hutzel, Walldorf (DE); Lior Schejter, Walldorf (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 14/020,657

(22) Filed: Sep. 6, 2013

(65) Prior Publication Data

US 2015/0074686 A1    Mar. 12, 2015

(51) Int. Cl.
| | |
|---|---|
| *G06F 9/54* | (2006.01) |
| *G06F 9/44* | (2006.01) |
| *G06F 17/30* | (2006.01) |
| *G06F 11/36* | (2006.01) |

(52) U.S. Cl.
CPC ............... *G06F 9/542* (2013.01); *G06F 11/36* (2013.01); *G06F 17/30371* (2013.01)

(58) Field of Classification Search
None
See application file for complete search history.

(56) References Cited

U.S. PATENT DOCUMENTS

| | | | |
|---|---|---|---|
| 5,761,493 A | 6/1998 | Blakeley et al. |
| 5,956,706 A | 9/1999 | Carey et al. |
| 5,999,908 A | 12/1999 | Abelow |
| 6,038,558 A | 3/2000 | Powers et al. |
| 6,195,709 B1 | 2/2001 | Gupner et al. |
| 6,516,310 B2 | 2/2003 | Paulley |
| 6,560,598 B2 | 5/2003 | Delo et al. |
| 6,567,798 B1 | 5/2003 | Hollberg et al. |
| 6,631,382 B1 | 10/2003 | Kouchi et al. |
| 6,732,084 B1 | 5/2004 | Kabra et al. |
| 6,799,184 B2 | 9/2004 | Bhatt et al. |
| 6,836,777 B2 | 12/2004 | Holle |
| 6,898,603 B1 | 5/2005 | Petculescu et al. |
| 6,938,041 B1 | 8/2005 | Brandow et al. |
| 6,996,568 B1 | 2/2006 | Bedell et al. |
| 7,107,497 B2 | 9/2006 | McGuire et al. |
| 7,194,744 B2 | 3/2007 | Srivastava et al. |
| 7,225,197 B2 | 5/2007 | Lissar et al. |
| 7,290,181 B2 | 10/2007 | D'Angelo et al. |
| 7,302,447 B2 | 11/2007 | Dettinger et al. |
| 7,305,414 B2 | 12/2007 | Manikutty et al. |

(Continued)

OTHER PUBLICATIONS

Ruby on Rails Guides, "Active Record Validations," Aug. 8, 2013, downloaded from the Internet at <url>:https://web.archive.org/web/20130808005838/http://guides.rubyonrails.org/active_record_validations.html on Aug. 27, 2015, pp. 1-37.*

(Continued)

*Primary Examiner* — Thuy Dao
*Assistant Examiner* — Stephen Berman
(74) *Attorney, Agent, or Firm* — Fountainhead Law Group PC

(57) ABSTRACT

Techniques are described for expressing a constraint in a host language. A constraint can be defined in the host language as an event handler. The event handler can be registered to a built-in event associated with an object of the database that the constraint is intended to validate. When the object triggers the built-in event, the event handler is called to execute the constraint. Exemplary built-in events include onSave (trigger the event when the object is saved), onValidate (trigger the event when an explicit call to validate the object is detected), onInsert (trigger the event when the object is inserted), onUpdate (trigger the event when the object is updated), and onCheckBeforeSave (trigger the event when the object is checked prior to saving).

20 Claims, 10 Drawing Sheets

(56) References Cited

U.S. PATENT DOCUMENTS

| | | | |
|---|---|---|---|
| 7,340,451 B2 | 3/2008 | Sacco | |
| 7,380,169 B2 | 5/2008 | Fossum et al. | |
| 7,398,530 B1 | 7/2008 | Parla et al. | |
| 7,421,448 B2 | 9/2008 | Spork | |
| 7,434,230 B2 | 10/2008 | Harold et al. | |
| 7,481,368 B2 | 1/2009 | Wang et al. | |
| 7,505,983 B2 | 3/2009 | Wildhagen et al. | |
| 7,523,090 B1 | 4/2009 | Sundman et al. | |
| 7,640,357 B2 | 12/2009 | Kirov et al. | |
| 7,653,828 B2 | 1/2010 | Kostadinov et al. | |
| 7,680,782 B2 | 3/2010 | Chen et al. | |
| 7,689,612 B2 | 3/2010 | Helsen et al. | |
| 7,693,819 B2 | 4/2010 | Stoychev | |
| 7,761,481 B2 | 7/2010 | Gaurav et al. | |
| 7,765,222 B2 | 7/2010 | Styles et al. | |
| 7,765,224 B2 | 7/2010 | Li et al. | |
| 7,788,241 B2 | 8/2010 | Cheng et al. | |
| 7,805,433 B2 | 9/2010 | Dickerman et al. | |
| 7,818,754 B2 | 10/2010 | Morris et al. | |
| 7,836,070 B2 | 11/2010 | Forstmann | |
| 7,873,605 B2 * | 1/2011 | Bhattacharyya | G06F 17/30377 707/679 |
| 7,885,840 B2 | 2/2011 | Sadiq et al. | |
| 7,895,226 B2 | 2/2011 | Koch et al. | |
| 7,912,820 B2 * | 3/2011 | Garden | G06F 17/30306 707/702 |
| 7,937,401 B2 | 5/2011 | Pasumansky et al. | |
| 7,970,823 B2 | 6/2011 | Moeller et al. | |
| 7,975,254 B2 | 7/2011 | Gilboa | |
| 7,996,443 B2 | 8/2011 | Nori et al. | |
| 8,005,850 B2 | 8/2011 | Walther et al. | |
| 8,010,521 B2 | 8/2011 | Kissner et al. | |
| 8,065,323 B2 | 11/2011 | Sallakonda et al. | |
| 8,069,184 B2 | 11/2011 | Becker et al. | |
| 8,078,643 B2 | 12/2011 | Mush et al. | |
| 8,122,009 B2 | 2/2012 | Dettinger et al. | |
| 8,146,103 B2 | 3/2012 | Schmidt et al. | |
| 8,185,508 B2 | 5/2012 | Vemuri et al. | |
| 8,191,081 B2 | 5/2012 | Schmidt et al. | |
| 8,209,280 B2 | 6/2012 | Kearney et al. | |
| 8,214,877 B1 | 7/2012 | Grimes et al. | |
| 8,219,919 B2 | 7/2012 | Norring et al. | |
| 8,250,094 B2 | 8/2012 | Skaria et al. | |
| 8,255,368 B2 | 8/2012 | Cox | |
| 8,281,283 B2 | 10/2012 | Speth et al. | |
| 8,286,916 B2 | 10/2012 | Pauly et al. | |
| 8,327,260 B2 | 12/2012 | Bays et al. | |
| 8,347,207 B2 | 1/2013 | Borgsmidt et al. | |
| 8,364,300 B2 | 1/2013 | Pouyez et al. | |
| 8,364,724 B2 | 1/2013 | Stolte et al. | |
| 8,370,400 B2 | 2/2013 | Brunswig et al. | |
| 8,375,041 B2 | 2/2013 | Webster et al. | |
| 8,386,916 B2 | 2/2013 | LeBrazidec et al. | |
| 8,407,215 B2 | 3/2013 | Sheedy et al. | |
| 8,407,237 B1 | 3/2013 | Kudryavtsev et al. | |
| 8,407,262 B2 | 3/2013 | Hsu et al. | |
| 8,407,309 B1 | 3/2013 | Feldman et al. | |
| 8,412,673 B2 | 4/2013 | Weissenberger et al. | |
| 8,417,732 B2 | 4/2013 | Rapp | |
| 8,429,176 B2 | 4/2013 | Sigurbjornsson et al. | |
| 8,473,506 B2 | 6/2013 | Sedlar et al. | |
| 8,478,515 B1 | 7/2013 | Foucher et al. | |
| 8,478,850 B2 * | 7/2013 | Delany | G06F 9/542 709/223 |
| 8,484,210 B2 | 7/2013 | Loh et al. | |
| 8,489,649 B2 | 7/2013 | Yalamanchi et al. | |
| 8,504,522 B2 | 8/2013 | Wu et al. | |
| 8,504,568 B2 | 8/2013 | Chandrasekhara et al. | |
| 8,505,032 B2 | 8/2013 | Craddock et al. | |
| 8,510,296 B2 | 8/2013 | Fan et al. | |
| 8,515,982 B1 | 8/2013 | Hickman et al. | |
| 8,805,875 B1 | 8/2014 | Bawcom et al. | |
| 8,849,771 B2 * | 9/2014 | Berg-Sonne | G05B 15/02 707/687 |
| 9,047,334 B1 * | 6/2015 | Cheriton | G06F 17/30348 |
| 2002/0100014 A1 | 7/2002 | Iborra et al. | |
| 2002/0138820 A1 * | 9/2002 | Daly | G06F 9/542 717/126 |
| 2003/0009649 A1 | 1/2003 | Martin et al. | |
| 2003/0135850 A1 | 7/2003 | Miloushev et al. | |
| 2003/0140036 A1 | 7/2003 | Belowsov | |
| 2003/0145255 A1 | 7/2003 | Harty et al. | |
| 2004/0117759 A1 * | 6/2004 | Rippert, Jr. | G06F 8/20 717/100 |
| 2004/0122817 A1 | 6/2004 | Kaiser | |
| 2004/0153435 A1 | 8/2004 | Gudbjartsson et al. | |
| 2004/0249856 A1 * | 12/2004 | Garden | G06F 17/30306 |
| 2005/0004904 A1 | 1/2005 | Kearney et al. | |
| 2005/0010565 A1 | 1/2005 | Cushing et al. | |
| 2005/0065958 A1 | 3/2005 | Dettinger et al. | |
| 2005/0187952 A1 | 8/2005 | Werner | |
| 2005/0256889 A1 | 11/2005 | McConnell | |
| 2005/0283459 A1 | 12/2005 | MacLennan et al. | |
| 2006/0195460 A1 | 8/2006 | Nori et al. | |
| 2006/0195476 A1 | 8/2006 | Nori et al. | |
| 2006/0224634 A1 | 10/2006 | Hahn et al. | |
| 2006/0235834 A1 | 10/2006 | Blakeley et al. | |
| 2006/0242104 A1 | 10/2006 | Ellis et al. | |
| 2006/0259912 A1 * | 11/2006 | Weinrich | G05B 19/418 719/315 |
| 2007/0118501 A1 | 5/2007 | Yan | |
| 2007/0219976 A1 | 9/2007 | Muralidhar et al. | |
| 2007/0226203 A1 | 9/2007 | Adya et al. | |
| 2008/0065862 A1 | 3/2008 | Hansen et al. | |
| 2008/0071799 A1 | 3/2008 | Evans et al. | |
| 2008/0091691 A1 | 4/2008 | Tsuji | |
| 2008/0120604 A1 | 5/2008 | Morris | |
| 2008/0133530 A1 | 6/2008 | Wang et al. | |
| 2008/0222159 A1 | 9/2008 | Aranha et al. | |
| 2008/0301168 A1 | 12/2008 | Adler et al. | |
| 2009/0240664 A1 | 9/2009 | Dinker et al. | |
| 2009/0292730 A1 | 11/2009 | Li et al. | |
| 2010/0082646 A1 | 4/2010 | Meek et al. | |
| 2010/0114935 A1 | 5/2010 | Palo-Malouvier et al. | |
| 2010/0131568 A1 | 5/2010 | Weinberg et al. | |
| 2010/0241637 A1 | 9/2010 | Kissner et al. | |
| 2010/0293523 A1 | 11/2010 | Ahadian et al. | |
| 2010/0318499 A1 | 12/2010 | Arasu et al. | |
| 2011/0154226 A1 | 6/2011 | Guertler et al. | |
| 2011/0161371 A1 | 6/2011 | Thomson et al. | |
| 2011/0225176 A1 | 9/2011 | Siegel et al. | |
| 2011/0231454 A1 | 9/2011 | Mack | |
| 2011/0238437 A1 | 9/2011 | Zhou et al. | |
| 2011/0302212 A1 * | 12/2011 | Agrawal | G06F 17/30371 707/793 |
| 2012/0005190 A1 | 1/2012 | Faerber et al. | |
| 2012/0016901 A1 | 1/2012 | Agarwal et al. | |
| 2012/0054142 A1 | 3/2012 | Du et al. | |
| 2012/0059802 A1 * | 3/2012 | Daniello | G06F 17/30371 707/687 |
| 2012/0109661 A1 | 5/2012 | Lueckhoff | |
| 2012/0130942 A1 | 5/2012 | Dipper et al. | |
| 2012/0131392 A1 | 5/2012 | Bendig | |
| 2012/0136868 A1 | 5/2012 | Hammerschmidt et al. | |
| 2012/0143810 A1 * | 6/2012 | Berg-Sonne | G05B 15/02 706/47 |
| 2012/0144383 A1 * | 6/2012 | Mishra | G06F 11/36 717/173 |
| 2012/0215768 A1 | 8/2012 | Zellweger | |
| 2012/0239987 A1 | 9/2012 | Chow et al. | |
| 2012/0265734 A1 * | 10/2012 | Perez | G06F 17/30292 707/687 |
| 2013/0110879 A1 | 5/2013 | Winternitz et al. | |
| 2013/0111310 A1 | 5/2013 | deOliveira et al. | |
| 2013/0117346 A1 | 5/2013 | Figus | |
| 2013/0151560 A1 | 6/2013 | Zurek | |
| 2013/0159354 A1 | 6/2013 | Heinzl et al. | |
| 2013/0166602 A1 | 6/2013 | Brunswig et al. | |
| 2013/0246355 A1 | 9/2013 | Nelson et al. | |
| 2014/0149180 A1 | 5/2014 | Yaseen et al. | |
| 2014/0245079 A1 | 8/2014 | Larson et al. | |

(56) References Cited

U.S. PATENT DOCUMENTS

2014/0258777 A1 9/2014 Cheriton
2014/0330916 A1* 11/2014 Xu .......................... G06F 9/542
 709/206
2014/0380266 A1* 12/2014 Bornhoevd ............. G06F 8/314
 717/104

OTHER PUBLICATIONS

Cialowicz et al., "What are good alternatives to SQL (the language)?," 2012, downloaded from the Wayback Machine Internet Archive at <url>: http://web.archive.org/web/20100604084412/http://stackoverflow.com/questions/2497227/what-are-good-alternatives-to-sql-the-language on Jan. 8, 2016, pp. 1-9.*
Bhargava, "Concurrency control in database systems," 1999, IEEE Transactions on Knowledge and Data Engineering, vol. 11, Issue 1, pp. 3-16.*
Paton et al., "Identification of database objects by key," 2005, Advances in Object-Oriented Database Systems, vol. 334 of the series Lecture Notes in Computer Science, pp. 280-285.*
Farber et al., "SAP HANA database: data management for modern business applications," 2011, ACM SIGMOD Record, vol. 40 Issue 4, pp. 45-51.*
Pattern: Fill Transient Attributes of Persistent Nodes; SAP; Jul. 6, 2013; p. 1.
Graphics: Display Method (SAP-SERM); SAP Library—BC Data Modeler; 2004; pp. 1-5.
AboveSoft Utilities; www.AboveSoft.com; Sep. 2010; pp. 1-6.
Ayers, Lonnie, PMP; SAP BW Data Modeling; SAP-BW Consulting, Inc.; pp. 1-18, printed on Aug. 29, 2013.
Heilman, Rich, HANA Product Management, SAP Labs LLC; Steyn, Werner, Customer Solution Adoption, SAP Labs, LLC; SAP HANA SQL Script Basics & Troubleshooting; Oct. 2012; pp. 1-47.

* cited by examiner

DATA MODELS CONTAINING HOST LANGUAGE EMBEDDED CONSTRAINTS

BACKGROUND

Many database structures rely upon Structured Query Language (SQL) as the standard approach to define, read, and manipulate data within a database. The database can include constraints and triggers to specify rules to maintain the integrity and consistency of the database. A constraint defines rules that the database must comply with. The constraint can be applied to a column, table, multiple tables, or an entire database schema.

A trigger is code that is automatically executed in response to an event for the purpose of maintaining the integrity of data on the database. For example, when a new record is added to an employees' table, a new record should also be added in the salaries table for the new employee. The constraints and triggers can be defined in the SQL and are executed when data is modified on a database table. However, not all application developers are proficient in SQL. Furthermore even if a developer is proficient in SQL, some constraints are complex and difficult to represent in SQL. Thus, there is a need for improved techniques to define constraints.

SUMMARY

Constraints are defined in a host language as event handlers. The techniques described include a computer-implemented method, a non-transitory computer readable storage medium storing one or more programs, and a computer system that can perform the computer-implemented method. In one embodiment, a computer implemented method comprises receiving, on a computer, a first event handler containing code configured to validate an object defined in a database, wherein an application configured to manage the database and the first event handler are in a host language, identifying, by the computer and according to the first event handler, a built-in event associated with the object, and registering, by the computer, the first event handler to the built-in event, wherein the application automatically calls the first event handler when the built-in event is triggered.

In one example, calling the first event hander comprises executing the first event handler on a separate thread than the application. In another example, the built-in event is detecting that the object is modified. In another example, the built-in event is detecting an explicit call to the built-in event. The explicit call is a built-in validate action belonging to the object.

In some examples, a second event handler configure to validate the object can also be received. The second event handler can also be in the host language. The computer can identify the built-in event and register the second event handler to the built-in event. When the built-in event is triggered, the application can automatically call the first event handler and the second event handler. In one example, the two event handlers can be executed in parallel. In another example, the two event handlers can be performed on separate threads.

The following detailed description and accompanying drawings provide a better understanding of the nature and advantages of the present invention.

DETAILED DESCRIPTION

Figure 1:
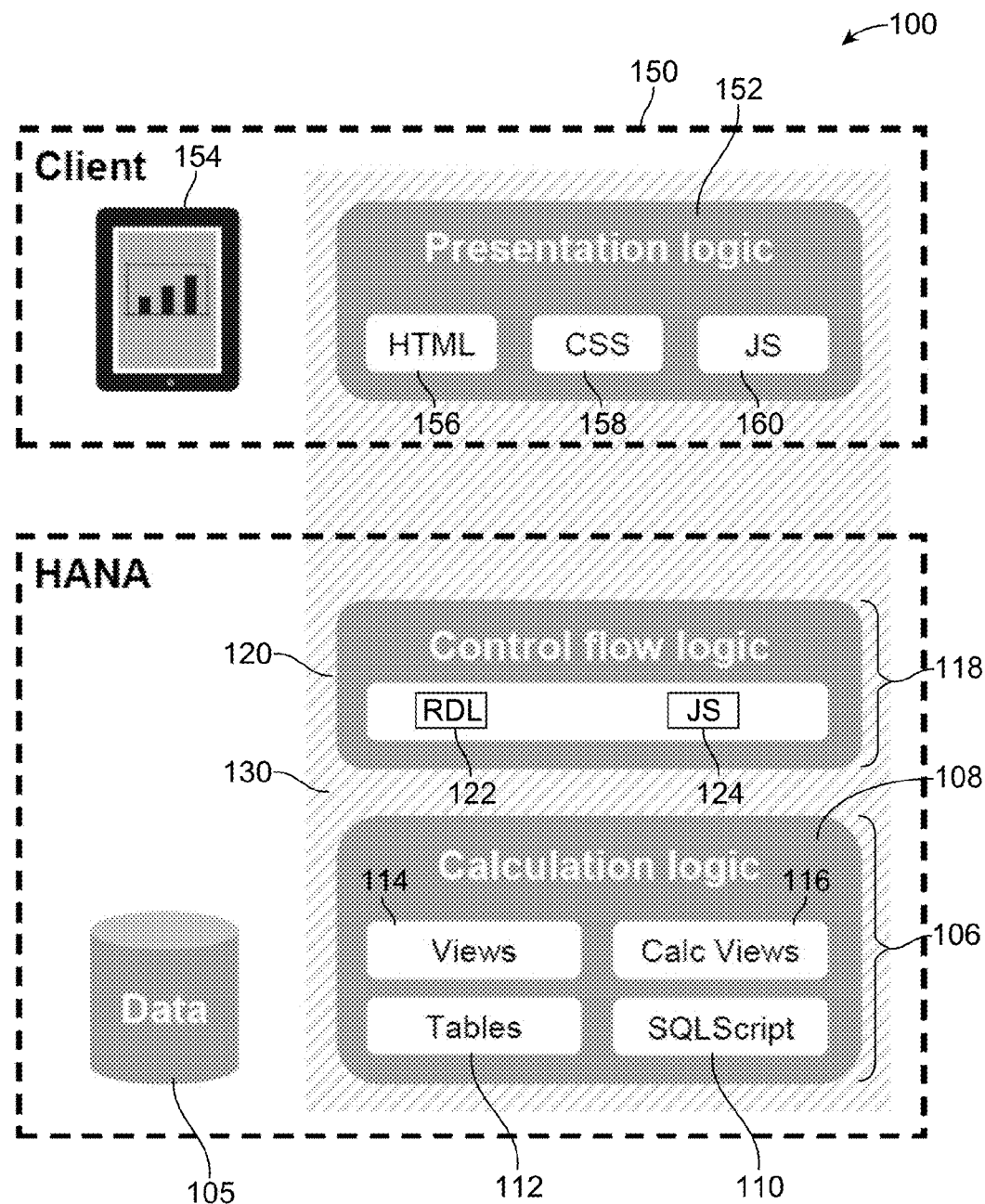
FIG. 1 shows a simplified view of a database system, according to an embodiment.

Described herein are techniques for expressing a constraint in a host language. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A host language can be the language used to generate an application for managing a database. A constraint is defined in the host language as an event handler. The event handler can be registered to a built-in event associated with an object of the database that the constraint is intended to validate. The object can be an entity in an entity relationship model (ERM). When the object triggers the built-in event, the event handler is called to execute the constraint. Exemplary built-in events include onSave (which triggers the event when the object is saved), onValidate (which triggers the event when an explicit call to validate the object is detected), onInsert (which triggers the event when the object is inserted), onUpdate (which triggers the event when the object is updated), and onCheckBeforeSave (which triggers the event when the object is checked prior to saving).

By expressing the constraint through an event handler, a developer can define a constraint using the host language. This can be desirable to a developer who is more familiar with the host language than the underlying database language. The defined constraint in the host language can be performed simultaneously with constraints that are defined on the data model. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein. The first part of the detailed description describes constraints in the host language as an event handler. The second part of the detailed description describes an exemplary extended data model that accommodates ERMs.

Constraints in the Host Language as an Event Handler

According to embodiments, a developer can express a constraint as an event handler in a host language. The event handler can include code that defines the constraint and identifies a built-in event that triggers the event handler. When a database object (such as an entity) is created, it is instantiated with various built-in events. The built-in events can include saving the object, creating the object, deleting the object, validating the object, and modifying the object. An event handler can be registered to any one of these built-in events such that triggering the built-in event calls the event handler. This allows the event handler, which represents the constraint, to be applied in a variety of situations.

Expressing the constraint on a higher level (e.g., application level) than the database table has many advantages. First, the constraint can be easier for an application developer to create. Second, the constraint can applied not only when the database is modified (e.g., inserted, updated, or deleted) but also through explicit calls in the application code. This can provide upfront data validation that notifies a user of potential violations that may result from modifying the database without changing the persistency of the database. Third, constraints generated in the host language are compatible with constraints generated in other levels such as the data model or the database table. Thus, constraints from different levels can be applied simultaneously.

An example of different categories of constraints that can be defined on the data model is given below. Typically, basic and simple constraints can be defined on the database table or as part of the data model while complex constraints can be defined using coding in the host language.

database that stores the data in relational tables. SQL layer 810 can also include database constraints 814. Constraints 814 maintain the consistency and integrity of database 812 by monitoring changes to database 812.

Above SQL layer 810 is CDS layer 820. CDS layer 820 is configured to create data model 822 which is configured to provide structure to database 812. In one example, CDS layer 820 can communicate with SQL layer 810 by performing queries for data to generate data model 822. Data model 822 is an entity relationship model that includes entity 824. Entity 824 further includes constraints 828 that are configured to validate data changes to entity 824.

Above CDS layer 820 is host language layer 830. Host language layer 830 includes application 832 written in the host language. Application 832 manipulates entities in data model 822, which in turn manipulates relational tables in database 812. Application 832 includes entity 834. Entity 834 can be defined in application 832 and be derived from entity 824. The host language layer 830 can automatically generate built-in events 838 when an entity is created in application 832. Built-in events 838 can be triggered by changes to the persistency of the entity. Application 832 further includes constraint 836. Constraint 836 can be defined using the host language. In one example, constraint 836 can be associated with entity 834 such that changes to entity 834 can trigger constraint 836. When entity 834 is modified, the changes can be passed down until they reach database 812. By allowing constraints to be defined in the host language, developers more familiar with the host language can create constraints that are easier to comprehend than if they were created in SQL layer 810 or CDS layer 820. In one example, constraint 836

| Category | Examples |
| --- | --- |
| Basic | NOT NULL<br>Key fields of entities<br>SalesOrder → Customer ID must be there<br>NOT INITIAL (MANDATORY)<br>Last Change Date must be set (no blank field) |
| Simple | Enum checks (field value part of enum (incl. extensions))<br>→ Relevance for LLVM/HANA Engine and possible benefits due to compiling → no dictionary lookup<br>Which ENUMS → stable lists → not too many values |
| Foreign key existence checks (associations? Compositions!) | → Difference between Associations/Compositions → Severity of check<br>SalesOrder has to have at least one item (associated entity (composition)) → Cardinality check |
| Dependent values or value domains | Amount has to have a currency if the amount value is not initial<br>Currency to be checked against the allowed currencies (value domain)<br>Currencies that are set via configuration as allowed currencies<br>Some product is only allowed to be shipped into defined countries (e.g. guns not into near-east)<br>salesOrder.Product.allowedShipmentCountries ~= salesOrder.deliverAdress.country |
| Field dependencies (values of one field depend on values of other fields) | German address (country code = DE), the postal code has to be set (NOT INITIAL), for US address (country code = US), the zipcode has to be set (NOT INITIAL) |
| Application Constraints | SalesOrder.Customer has to exist (existence check on customer ID) and customer has to have status „released"<br>To allow shopping on invoice, a customer has to have at least one other order where he paid<br>Discount 10% only allowed if order volume >500$ (configurable) and customer has A-Rating, else only 5% discount |

Figure 8:
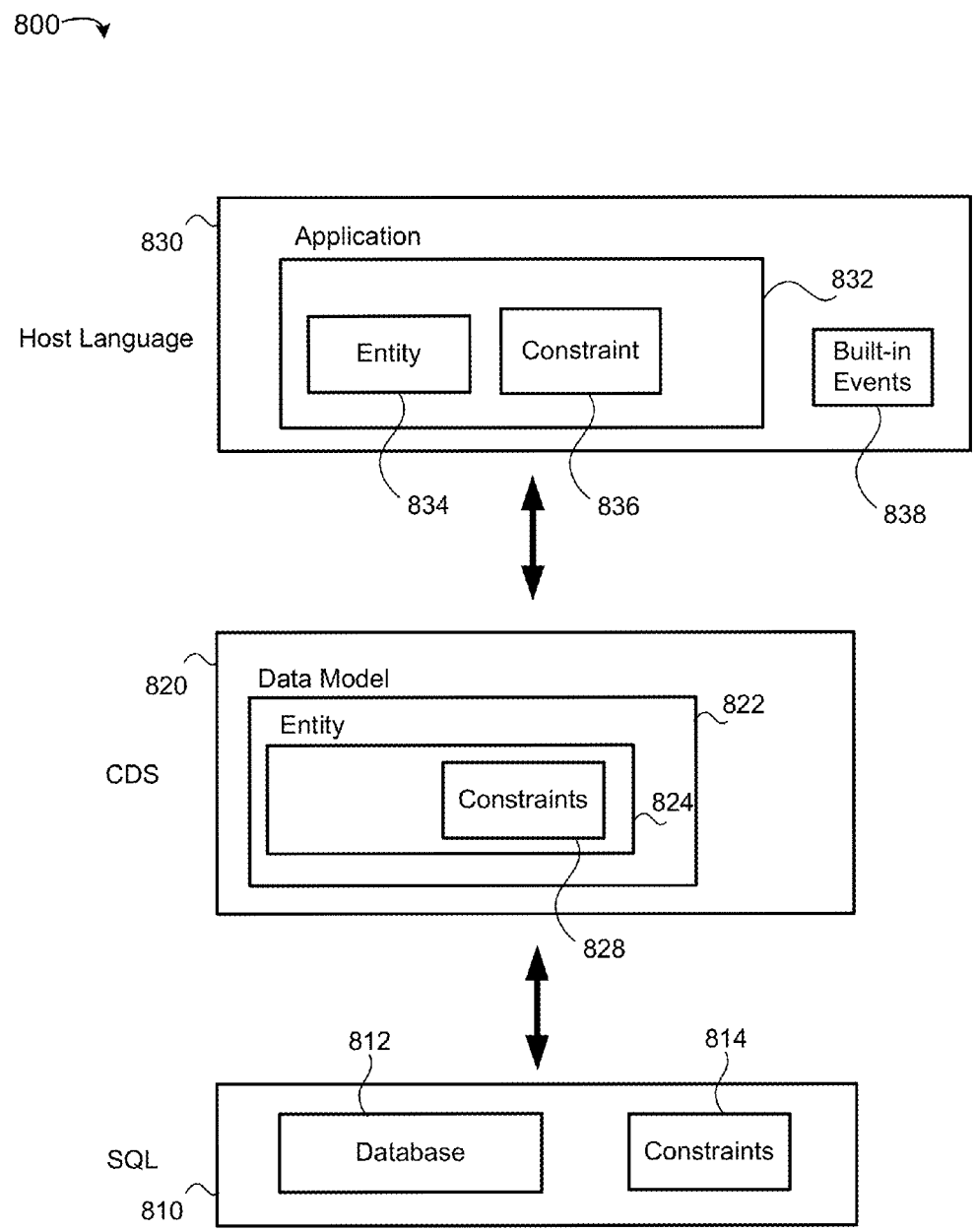
FIG. 8 illustrates a simplified view of a database structure, according to one embodiment.

FIG. 8 illustrates a simplified view of a database structure according to one embodiment. Database structure 800 includes three layers—SQL layer 810, core data services (CDS) layer 820, and host language layer 830. SQL layer 810 can contain database 812. Database 812 can be a relational can be attached to an event handler and registered to a built-in event of entity 834 so that the constraint is performed when the built-in event is triggered. In other embodiments, the built-in events can be generated in layers other than the host language layer.

Defining a Constraint in an Event Handler

Figure 9:
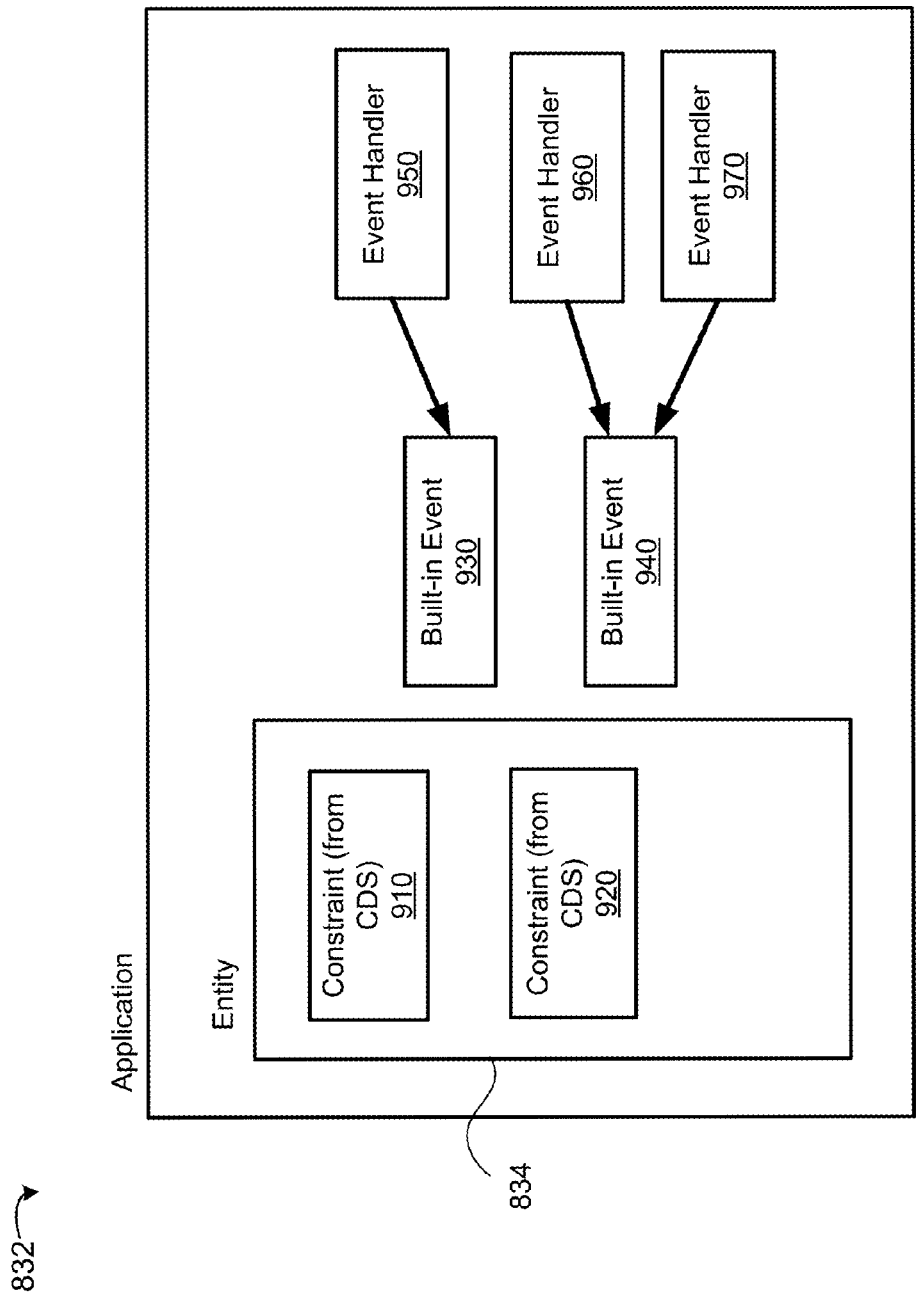
FIG. 9 illustrates an application that includes constraints defined in an event handler, according to one embodiment.

FIG. 9 illustrates an application that includes constraints defined in an event handler according to one embodiment. Defining a constraint in an event handler has the advantage that a constraint created in the host language can be triggered by built-in events of the host language layer. As a result, creating constraints does not require a developer to be proficient in languages other than the host language. As shown here, application 832 includes entity 834. Entity 834 includes constraint 910 and constraint 920 (which are part of the entity defined in the data model), built-in event 930, and built-in event 940. These constraints and built-in events can be defined in the host language, data model, or the underlying database table. In one example, built-in event 930 and built-in event 940 can be one of onSave (which triggers the event when the object is saved), onValidate (which triggers the event when an explicit call to validate the object is detected), onInsert (trigger the event when the object is inserted), onUpdate (which triggers the event when the object is updated), and onCheckBeforeSave (which triggers the event when the object is checked prior to saving). An example of an entity with a built-in event is given below. As shown, entity salesOrder as defined in the data model includes a built-in event onValidate. Event handlers that are registered to the built-in event onValidate can be called when the built-in event is triggered.

```
entity salesOrder {
    event onValidate {
        //serialized representation of an entity could also be "this"
        element source : serializedData;
    }
}
```

An example of a built-in action that raises (i.e., triggers) an event is given below. As shown, a validate action performed on the entity raises event onValidate. Thus, the event onValidate is raised when an built-in validate action is detected.

```
@raise.error : 'system.constraintViolation';
action validate( ) {
    // open an error context here
    Raise event onValidate ;
    If system.messages.hasErrors( ) {
        Raise error system.constraintViolation;
    }
}
```

Application 832 further includes event handlers 950, 960, and 970. Event handlers 950, 960, and 970 can be generated in the host language and contain code configured to validate entity 834. In other words, each event handler can include a constraint. An example of an event handler that is defined on the entity is given below. As shown, the event handler is registered to event onValidate and includes a constraint configured to validate a property of the entity salesOrder. In other examples, the event handler can be defined apart from the entity yet be registered to a built-in event of the entity.

```
entity salesOrder {
    key ID : integer NOT NULL;
    customer : association to customer;
    OrderDate : date;
    createdBy : string;
    lastChangeDate : date;
    amount : amount {
```

```
        value : float
        currency : currency
    }
    action validate( ) // built-in action
    On event e : onValidate as validateAmount {
        Let so : salesOrder = deserialize( e.source );
        if so.amount.value != 0 {
            if !exists( so.amount.currency ) {
                // populate the error to the buffer as channel to communicate
                violations
                Let constraintError : system.message = { };
                constraintError.severity = severity.error;
                constraintError.identifier = 'validateAmount';
                constraintError.data = serialize( so );    // or just passing
                e.source
                system.messages.addMessage( constraintError );
            }
        }
    }
}
```

Each event handler includes a constraint that can identify a built-in event that the event handler is to be registered to. In the example above, the event handler is to be registered to the event onValidate. Here, event handler 950 is to be registered to built-in event 930 while event handlers 960 and 970 are to be registered to built-in event 940. In one example, application 832 can register each event handler to its respective built-in event according to the constraint defined in each event handler. By registering event handler 950 to built-in event 930, application 832 calls event handler 950 when built-in event 930 is triggered (i.e., raised). When event handler 950 is called, the constraint defined in event handler 950 is performed. In one example, the constraint can be performed in a separate thread than application 832. In some examples where multiple event handlers are registered to the same built-in event, the multiple event handlers can be called simultaneously. The multiple event handlers can also be performed on separate threads. Here, application 832 can simultaneously call on event handler 960 and 970 when built-in event 940 is triggered. Calling on event handler 960 and 970 can include performing the constraints in the respective event handlers in separate threads.

Figure 10:
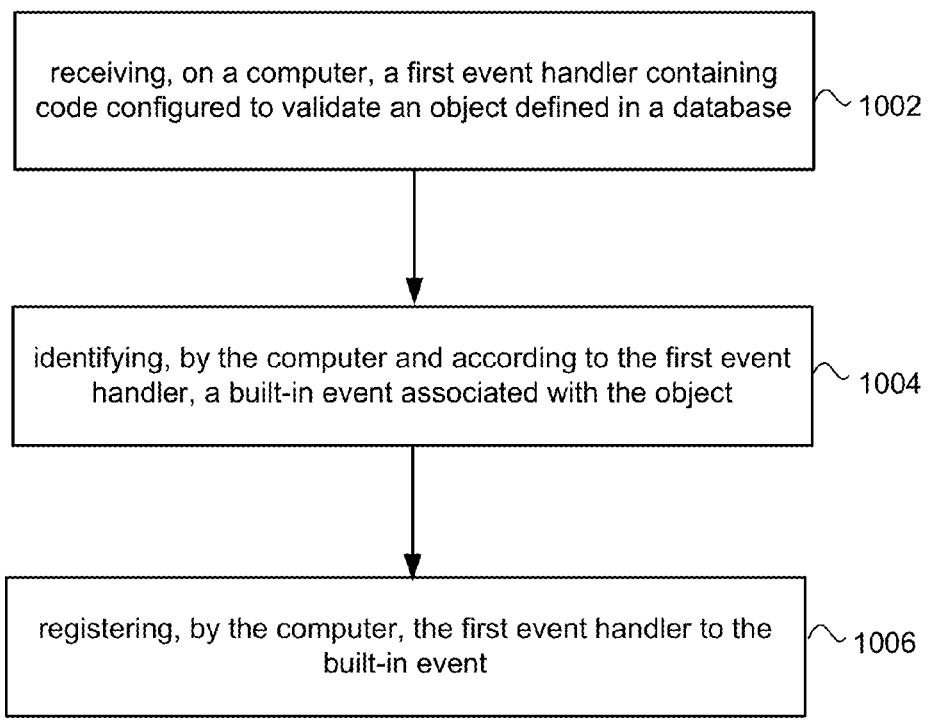
FIG. 10 illustrates a simplified view of a process flow 1000, according to an embodiment.

FIG. 10 illustrates a simplified view of a process flow 1000 according to an embodiment. Process 1000 begins by receiving, on a computer, a first event handler containing code configured to validate an object defined in a database at 1002. In one example, an application configured to manage the database and the first event handler is in a host language. The code can represent a constraint to validate an entity in an entity relationship model.

Process 1000 then continues by identifying, by the computer and according to the first event handler, a built-in event associated with the object at 1004. In one example, the built-in event is detecting that the object is modified. In another example, the built-in event is detecting an explicit call to the built-in event. The explicit call can be a built-in validate action belonging to the object or another built-in action associated with the object such as a save action or an update action.

Once the built-in event has been identified, process 1000 continues by registering, by the computer, the first event handler to the built-in event at 1006. The application can automatically call the first event handler when the built-in event is triggered. Calling the first event hander can include executing the first event handler on a separate thread than the application.

In some embodiments, a second event handler also written in the host language can be received that is also configured to validate the object. The second event handler can be registered to the same built-in event as the first event handler. When the built-in event is triggered, the application can call on the first event handler and the second event handler and the two event handlers can be executed in parallel. Each event handler can be performed by the computer in a separate thread.

Extended Data Model to Accommodate ERMs

Described herein are techniques for extending a relational model-based database language (e.g., Structured Query Language known as SQL), to accommodate higher level entity-relationship models. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

FIG. 1 shows a simplified view of a database system 100, according to an embodiment. In particular, the database system 100 comprises data 105 of the database itself, organized according to a relational model.

A lower layer 106 of the database system comprises calculation logic 108 that is designed to interact with the data 105 itself. Such calculation logic 108 may be performed by various engines (e.g., SQL engine, calculation engine, SQL script) in order to provide basic data definition and processing based on the relational model. Such basic data definition can include defining of data types making up the database, associated metadata, and the database structure (e.g. columns, tables). The lower layer 106 of the database system may include SQL script 110, as well as data structures such as tables 112, views 114, and calculation views 116.

The embodiment presented in FIG. 1 shows HANA, the in-memory database available from SAP AG of Walldorf, Germany, implemented as the database. However, embodiments are not limited to use with this particular database. Examples of other in-memory databases include, but are not limited to, the SYBASE IQ database also available from SAP AG; the Microsoft Embedded SQL for C (ESQL/C) database available from Microsoft Corp. of Redmond, Wash.; the Exalytics In-Memory database available from Oracle Corp. of Redwood Shores, Calif., etc.

Further, while the embodiment presented in FIG. 1 shows the database as comprising an in-memory database, various embodiments could be employed in conjunction with conventional disk-based database systems.

An application layer 118, overlying the calculation logic 108 of the database system 100 comprises control flow logic 120. The control flow logic 120 may be implemented utilizing River Definition Language (RDL) 122 and JavaScript (JS) 124 to reference model concepts such as entities and relationships that are not reflected in basic SQL. This control flow logic 120 may further comprise common languages for defining and consuming data across different containers (e.g. native, ABAP, Java).

As shown in FIG. 1, in order to facilitate the sharing of information across such different containers and thereby promote a more unified environment, the database system 100 may further comprise a Core Data Services (CDS) component 130. CDS component 130 comprises a common set of domain-specific languages (DSL) and services. The CDS component 130 may allow defining and consuming semantically rich data models as an integral part of the database structure, thereby permitting data modeling as well as the retrieval and processing of data to be raised to a higher semantic level that is closer to the conceptual thinking of domain experts. The role of the CDS component 130 is discussed in detail further below.

FIG. 1 further shows client 150 in communication with the HANA in-memory database appliance available from SAP AG. The client 150 includes presentation logic 152 to provide an output 154 comprising data 105 of the underlying database structure in a form desired by a user. Here, the output 154 is shown as a vertical bar chart, but of course this represents only one of a multitude of different ways in which the data may be communicated to a user. The presentation logic 152 may communicate such output in the form of HTML 156, cascading style sheets (CSS) 158, and/or JavaScript 160, or a variety of other user interface technologies.

Figure 2:
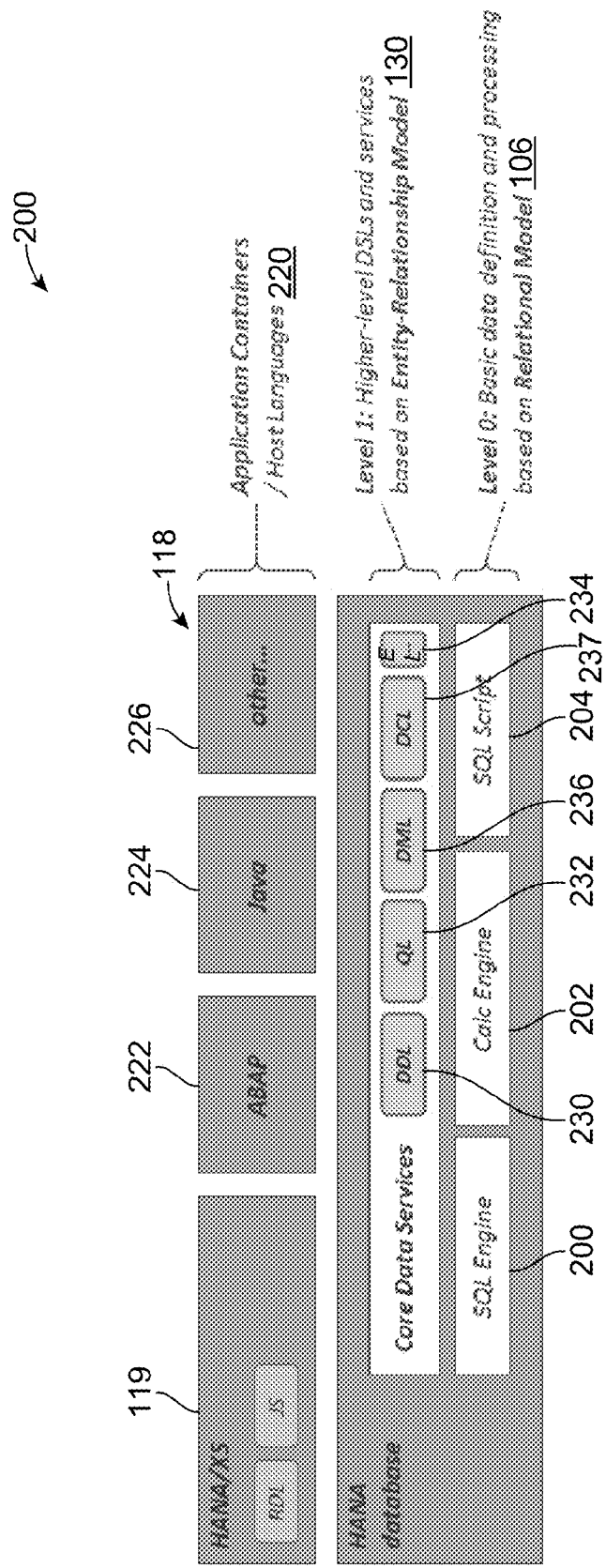
FIG. 2 shows an enlarged view of the database structure of FIG. 1.

FIG. 2 shows an enlarged view of the HANA in-memory database structure of FIG. 1. In particular, FIG. 2 shows SQL engine 200, calculation engine 202, and SQL script 204, as part of the lower layer 106 that performs basic data definition and processing based upon the relational model, according to which the data 105 of the database is organized. FIG. 2 also shows the application layer 118 of the database structure of FIG. 1, including the RDL and JS elements of a query engine 119. The application layer 118 further comprises application containers and other host languages 220, including ABAP 222, Java 224, and others 226.

FIG. 2 further shows the CDS component 130 situated between the lower layer 106 and the application layer 118. As illustrated in this figure, the CDS component 130 can be leveraged in any consuming stack variant (stack of software layers located on top of each other), as implemented through the application layer 118. Specifically, services in higher layers can use/consume the services of lower layers. Here, because the application layer sits on top of a data layer in which the CDS component 130 resides, definition and consumption of the semantically rich higher-level models is allowed.

In particular, the CDS component 130 implements higher-level Domain Specific Languages (DSLs) and services based on an entity-relationship model (ERM). The Data Definition Language (DDL) 230 is used for defining semantically rich data models, including the data types, associated metadata, and database organization (e.g., columns and tables). As mentioned throughout, according to embodiments, the DDL may be extended to further enrich these data models through the use of entities and annotations.

The Query Language (QL) 232 is used to conveniently and efficiently read data based on data models. It is also used to define views within data models. The role of the QL 232 and its relation to the DDL 230 is further illustrated in connection with FIG. 3.

The Expression Language (EL) 234 is used to specify calculated fields, default values, constraints, etc., within queries. Calculated fields, default values, and constraints may be specified as well as for elements in data models.

Other elements of the CDS component 130 can include Data Manipulation Language (DML) 236 and a Data Control Language (DCL) 237, both of which may be used to control access to data.

Figure 3:
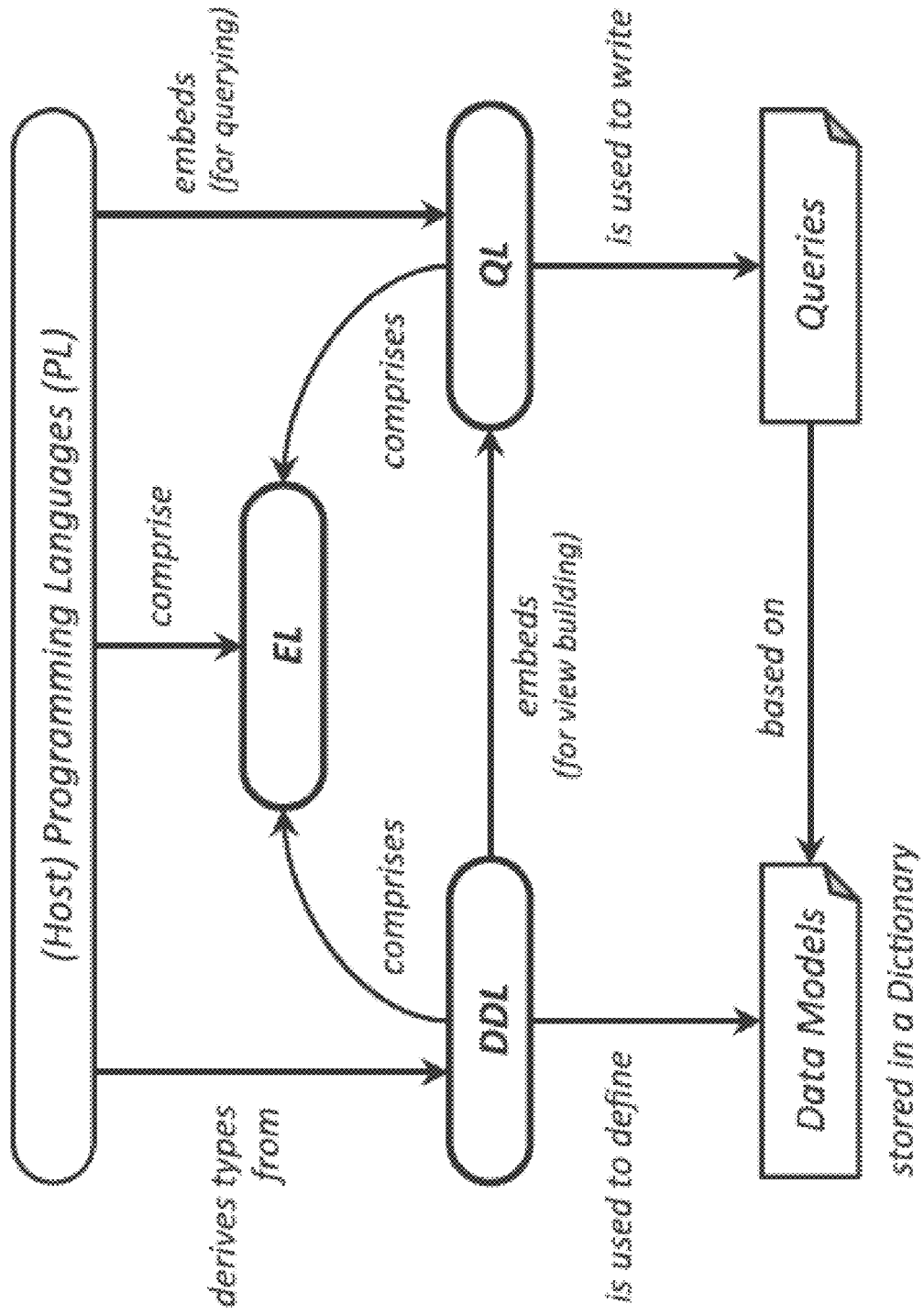
FIG. 3 illustrates relationships between individual languages making up a language family useful for interacting with a database.

Embodiments as described herein may distinguish between the domain-specific languages DDL, QL, and EL as members of a language family. This approach fosters considerations such as modular design, incremental implementation, and reuse. FIG. 3 is a simplified view illustrating relationships between these language family members. A consistent language experience across the members of the family of FIG. 3 can be achieved by ensuring the languages follow a common style. This can extend to the host programming language, with expressions in DDL, QL, and EL code adopting the same syntax. Utilization of application level domain language(s) as has been described above, can offer certain benefits. One possible benefit is that the application domain level language can avoid the use of "inefficient" and error-prone code.

Take, for example, the following simple data model describing employee information:

```
entity Employee {
    name : String(77);
    salary : Amount;    // a structured type
    orgunit : Association to OrgUnit;
    addresses : Association to Address[0..*] via entity
    Employee2Address;
    homeAddress = addresses[kind=home];    // introduced later on
}
entity OrgUnit {
    name : String(111);
    costcenter : String(44);
    manager: Association to Employee;
    parent: Association to OrgUnit;
}
entity Address {
    key streetAddress; key zipCode; city;    // omitted type defs
    kind : enum { home; business; }
}
```

Under some circumstances, it may be desired to write a query statement as follows: SELECT id, name, homeAddress.zipCode FROM Employee WHERE . . . .

Within that sample snippet, path expressions along relationships are used to fetch data from an associated entity. In the simple data model above, the above query statement is equivalent to the following standard SQL statement:

```
SELECT e.id, e.name, a.zipCode FROM Employee e
LEFT OUTER JOIN Employee2Address e2a ON e2a.employee = e.id
LEFT OUTER JOIN Address a ON e2a.address = a.id AND
a.type='homeAddr'
WHERE ...
```

This statement, however, may already be too complex for many application developers. Thus, code patterns similar to that given below, may be used in some pseudo languages:

```
customers = SELECT * FROM Customer
foreach c in customers do
    write c.id
    write c.name
    addresses = SELECT * FROM Address a, $Customer2Address c2a
        WHERE a.id = c2a.address AND c2a.customer = :c.id
    foreach a in addresses do
        if a.type = 'homeAddr' then write a.zipCode
    end
end
```

There are several issues with the code presented immediately above. One issue is the use of an imperative coding style with loops in loops, resulting in 1+n queries being executed or too much data being fetched with a SELECT * statement.

The above code represents only a relatively simple case. A more complex case is found in the following example:

```
SELECT FROM OrgUnit[boardarea='TIP'] .employees[salary>
    '$100.000'] { addresses[kind=home].city, count(*)
}
```

The preceding cases illustrate the importance of increasing expressiveness of the languages used in application development (here, the query language). This allows the intent of application developers to be captured, rather than being buried under substantial volumes of imperative boilerplate coding.

Such expressiveness is in turn is fundamental to having optimizations applied by the query engine (in a manner analogous to functional programming vs. imperative programming). This can affect system characteristics, such as its overall performance and scalability. Further, a language's ability to allow developers to draft concise and comprehensive code, can increase developer productivity. It can also reduce the risk of mistakes and also enhance readability, and thus increase the maintainability of the code.

In order to write concise and readable query statements, it is desirable to enrich the data definitions with sufficient metadata (e.g., about associations, semantic types, etc.). Accordingly, embodiments seek to extend the DDL to define data definitions with sufficient metadata, and seek to extend the QL to leverage such definitions.

DDL and QL are declarative, domain-specific languages providing developers with concise ways to express their models and queries. Certain concepts may originate from entity-relationship modeling (ERM). By adding native support for such concepts in the underlying engine of the database, embodiments avoid the impedance mismatch induced by the translation of conceptual models based on ERM into implementations based upon a plain relational model. In particular, writing concise and comprehensive code reduces risks of mistakes and increases readability and maintainability.

Moreover, as the concepts of entity-relationship models may lie at the core of many higher-level models, embodiments are able to capture the semantics of other data models (e.g., RDL-based data models), and share those semantics with database modelers, and/or ABAP of SAP AG, or Java consumers. This reduces fragmentation and the loss of semantics. In addition, since ERM is also the chosen basis for technologies like OData EDM, embodiments can facilitate mapping entities and views to OData entity sets.

Embodiments may employ a functional approach that is based on standard SQL. In particular, the comprehensive, domain-specific nature of DDL and QL allows capturing the intent of application developers, thus avoiding a lack of clarity regarding that intent which can result from large volumes of imperative boilerplate coding. This follows the principles of functional programming and is important for optimizations.

The functional approach may be inherited from SQL. A SQL SELECT statement declares which sub-set of an overall data model is of interest as projections and selections. It may be left to the query engine to determine optimal execution, including parallelizing as appropriate.

In contrast with imperative object traversal patterns, embodiments can speed up many data retrieval use cases. While many of those retrieval cases are not individually expensive, the cumulative impact of this streamlining can have significant impacts on scalability, as it affects all requests over long periods of time.

Embodiments address some of the complexity offered by standard SQL to typical application developers by raising the basis of SQL from plain relational models to the level of conceptual models. This is done by providing native support for ERM in the database system. In this manner, the use of SQL may be reestablished for most application developers, not only for those with the SQL expertise for specific optimization tasks.

Embodiments employ associations in DDL. Specifically, the DDL allows definition of data models as entity-relationship models on a semantically rich level that is close to actual conceptual thought. To achieve this over the conventional relational model of standard SQL, certain concepts are captured by the embodiments described herein.

Figure 4:
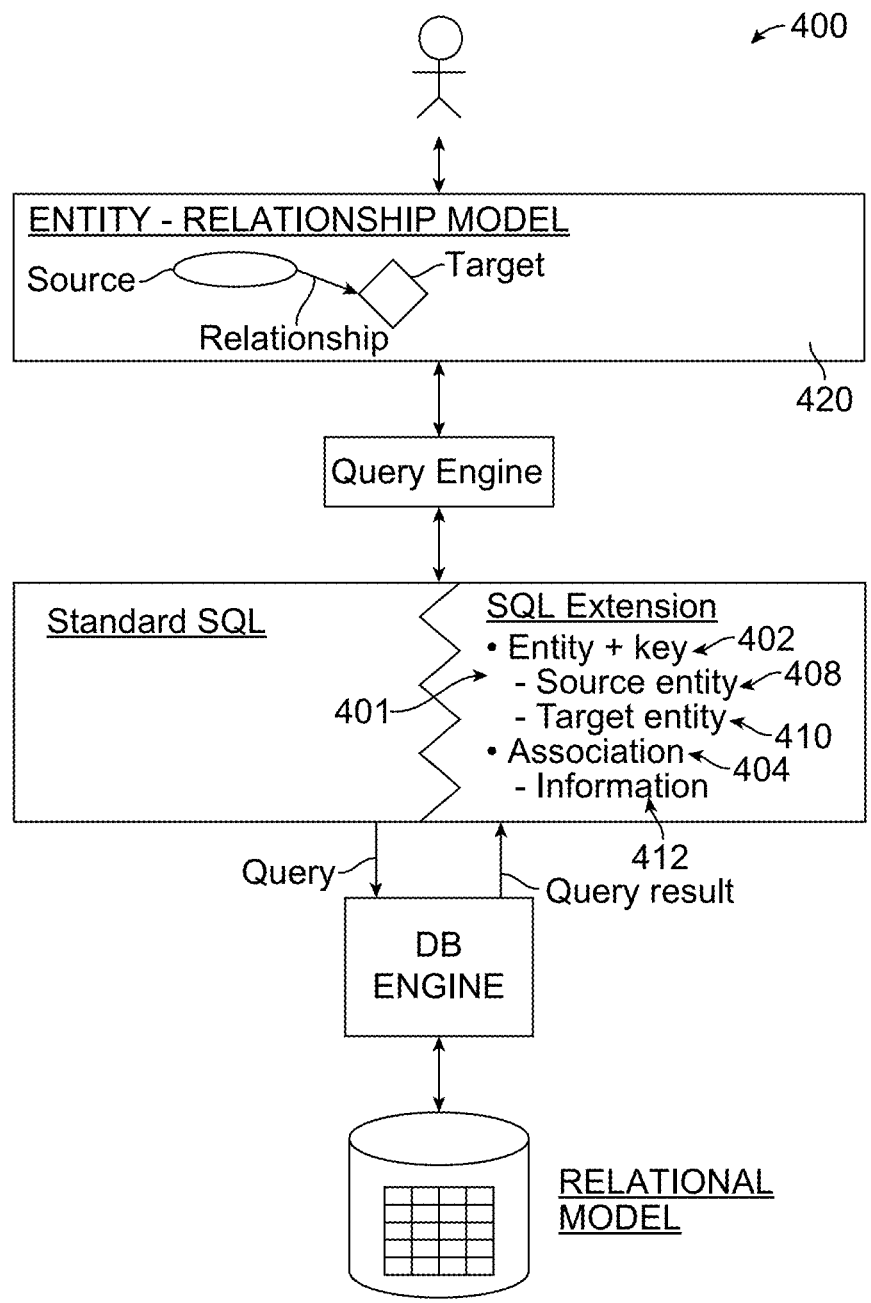
FIG. 4 is a simplified view showing an approach for extending SQL, according to embodiments.

FIG. 4 is a simplified view showing an approach for extending SQL according to embodiments. As shown in the system 400 of FIG. 4, one concept underlying embodiments as described herein, is the use of entities 401 with structured types, in contrast with a conventional relational database which uses only flat tables. Entities are structured types with an underlying persistency and a unique key 402. Structured types are records of named and typed elements. An entity key is formed of a subset of the elements of the entity that uniquely identify instances. Views are entities defined by a query, which essentially defines a projection on underlying entities.

Another concept underlying entities as described herein, involves employing associations 404 on a conceptual level. This approach contrasts with the conventional use of hand-managed foreign keys. Associations define relationships between entities, and are specified by adding an element with an association type to a source entity 408 that points to a target entity 410. As shown in the FIG. 4, the relationship implemented by the association type, between source entity type and the target entity type, reflects the actual relationship between entities in the overlying ERM model 420. Using the type definition, associations may capture metadata about relationships present in the ERM in a 'reflectable' way. According to such a reflectable characteristic, a consuming portion of code receiving a piece of data from the database can get back to the type information (i.e., metadata) provided for the respective elements in the data model.

The association may be complemented by optional further information (e.g., regarding cardinality, which keys to use, additional filter conditions, etc.) up to a complete JOIN condition. According to embodiments, the clause-based syntax style of standard SQL may be adopted for specifying the various parameters without sacrificing readability.

In addition, the extended DDL works with custom-defined Types instead of being limited to primitive types only. The extended DDL may also add other enhancements, such as annotations, to enrich the data models with additional metadata, constraints, or calculated fields.

Figure 5:
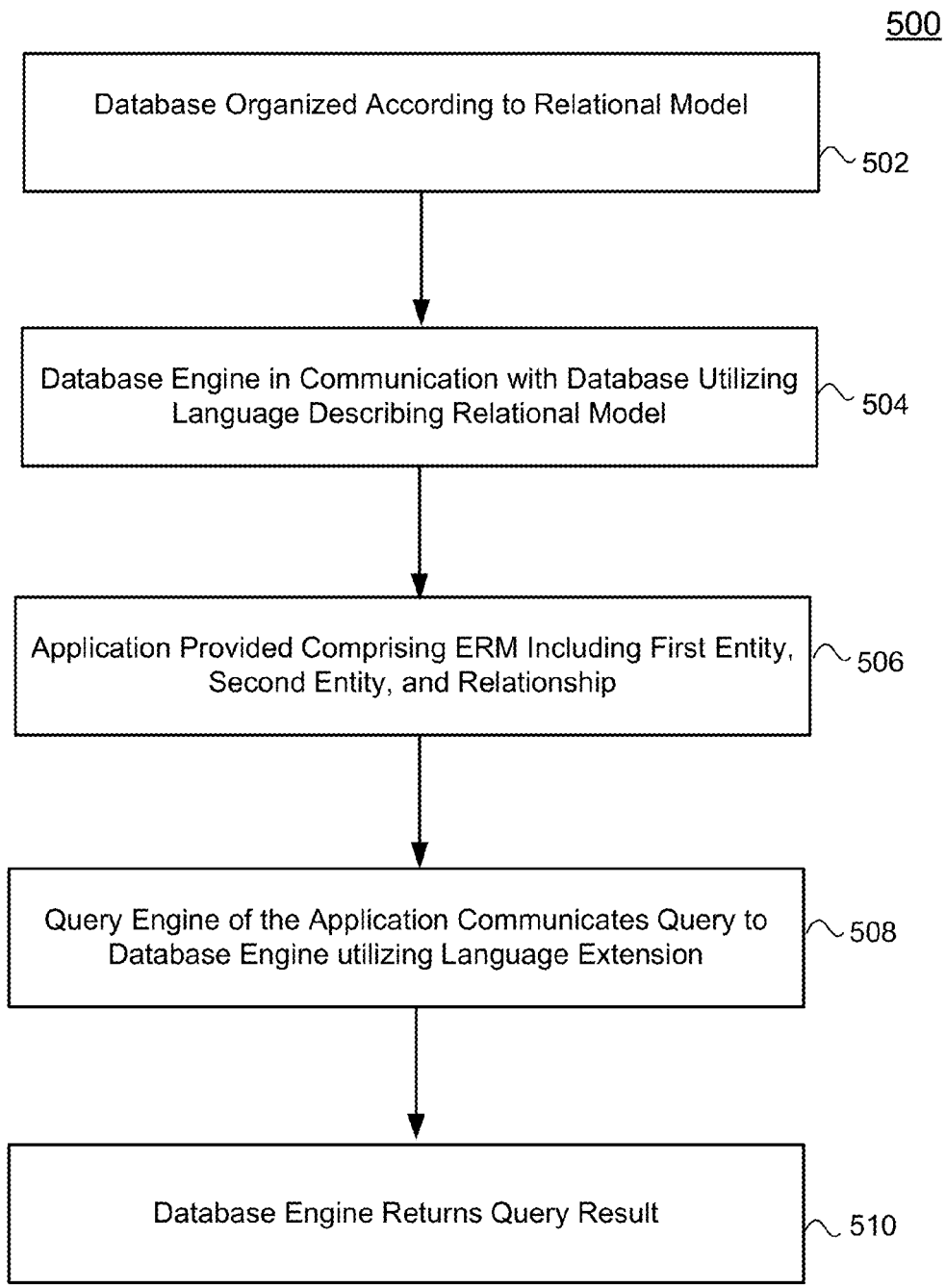
FIG. 5 is a simplified diagram illustrating a process flow, according to an embodiment.

FIG. 5 is a simplified diagram illustrating a process flow 500 according to an embodiment. In a first step 502, a database is provided comprising data organized according to a relational model.

In a second step 504, a database engine is provided in communication with a database utilizing a language describing the relational model. In a third step 506, an application is provided comprising an entity-relationship model (ERM) including a first entity, a second entity, and a relationship between the first entity and the second entity.

In a fourth step 508, a query engine of the application communicates a query to the database engine utilizing a language extension providing the entity and relationship components of the ERM. The language extension may comprise a first structured entity type including a first key and indicating the first entity, a second structured entity type including a second key and indicating the second entity, and a third structured association type reflecting the relationship. The association type may be complemented with further additional information.

In a fifth step 510, the database engine returns a query result to the query engine based upon the language extension.

EXAMPLES

Some examples of extension of the SQL database language to provide entities and associations of ERMs, are now given below.

```
entity Address {
    owner : Association to Employee;        // can be used for :m associations
    streetAddress; zipCode; city;           // snipped type defs
    kind : enum { home, business };
}
entity Employee {
    addresses : Association[0..*] to Address via backlink owner;
    homeAddress = addresses[kind=home]; // → using XPath-Like filter.
}
Association to Address;
Association to Address { zipCode, streetAddress };
Association [0..*] to Address via backlink owner;
Association [0..1] to Address via backlink owner where kind=home;
Association [0..*] to Address via backlink owner where zipCode like '76*';
Association [0..*] to Address via entity Emp2Adr;
Association [0..1] to Address via entity Emp2Adr where kind=home;
Association [0..*] to Address on owner=this;
Association [0..*] to Address on Address.owner._id = Employee._id;
Association to Address on owner=this AND kind=home;
```

For specifying syntax, embodiments may use a derivate of the Backus Naur Form (BNF) family of metasyntax notations used to express a context-free grammar, and which can be relied upon to make a formal description of a computer language. The basic constructs may be summarized as follows:

| Construct | Notation | Comments |
|---|---|---|
| definition | = | Definitions are written with a single equals sign, e.g. Rule = ... |
| extension | += | Extends a definition introduced before by additional rules |
| terminal symbol | keyword | Language keywords are set in bold red |
| terminal character | "." | Single-character language symbols are set in double quotes |
| alternation | ... \| ... | Pipe symbols separate alternatives, e.g. foo and bar \| zoo w/car |
| grouping | ( ... ) | Parenthesis group constructs, e.g. ( foo \| bar ) with car |
| option | [ ... ] | Square brackets designate optional constructs, e.g. [ optional ] |
| repetition | ...* | 0+ repetitions are indicated by appended "*", e.g. zeroOrMore* |
| repetition | ...+ | 1+ repetitions are indicated by appended "+", e.g. oneOrMore+ |
| comment | -- ... | Comments start with a double-dash, e.g. -- this is a comment |

Syntax for SQL extended to include entities and associations as described herein, may be described as follows:

```
AssignedType += | AssociationType

AssociationType = Association[cardinality](to targetEntity)
    [managedJoin | unmanagedJoin]

cardinality = "["[(maxs|*)", "][min ... ](max|*)"]" | "[]"

targetEntity = QualifiedName managedJoin = ( forwardLink | backwardLink | mediatedLink )
    [where filterClause]

forwardLink = "{" foreignKeys "}"

backwardLink = via backlink reverseKeys mediatedLink = via entity entityName foreignKeys = targetKeyElement
    [AS alias][", "foreignKeys]

reverseKeys = targetKeyElement targetKeyElement = element(".""elementName)* unmanagedJoin = on filterClause
```

From DDL perspective, association is a new primitive type that is specified with the type name Association, followed by several parameter clauses to specify requisite metadata. These parameter clauses are as follows:

Cardinality allows specifying the relationship's cardinality in the form of [min ... max], with max=*denoting infinity and "[ ]" as a shorthand for [0 ... *]. As a default, if omitted [0 ... 1] is used as the default cardinality. An example is:

Association[ ] to Address via backLink owner;

To targetEntity specifies the association's target entity. A qualified name is expected, referring to another entity (incl. views). Specifying the target is mandatory—there is no default.

{foreignKeys} allows specifying a combination of alternative key elements in the target entity, to be used to establish the foreign key relationship. Where a key element is in a substructure on the target side, an alias name is to be specified. Further details are provided below regarding associations represented as foreign key relationships.

If omitted, the target entity's designated primary key elements are used. The following are examples:

```
Association to Address { zipCode, streetAddress };
Association to Address { some.nested.key AS snk };
```

Another parameter clause is VIA backlink: reverseKeys. For 1:m associations, it is mandatory to specify target elements, which are expected to be a key combination matching the source's primary keys or an association referring to the source entity. An example is:

Association to Address via backLink owner;

Another parameter clause is VIA entity: entityName. For m:m associations, it is mandatory to specify a link table's entity name. That name can either refer to a defined entity or a new entity will be created as follows:

```
entity <entityName> {
    <nameOfSourceEntity> : Association to <SourceEntity>;
    <nameOfTargetEntity> : Association to <TargetEntity>;
}
```

If the data model contains an explicit definition of the link table entity, that entity must adhere to the template shown above. It can, in addition, add other elements. An example is given below:

```
Association to Address via entity Employee2Address;
entity Employee2Address {
    employee : Association to Employee;
    address : Association to Address;
}
```

The WHERE filterClause allows specifying additional filter conditions that are to be combined with the JOIN conditions. This can be especially relevant in combination with VIA backlink or entity clauses. Depending on the filterCondition this can reduce a base :m relationship to one with a:1 cardinality. An example is given below:

Association to Address[0 ... 1] via backLink owner where kind=home;

The ON filterClause allows fully specifying an arbitrary join condition, which can be any standard SQL filter expression. Using this option results in the respective association being user-managed. That is, no foreign key elements/fields are created automatically. The developer is expected to explicitly manage the foreign key elements, including filling them with appropriate foreign key values in write scenarios. An example is given below:

Association to Address on owner=this;

Element names showing up in VIA, WHERE, and ON clauses, are resolved within the scope of the target entity's type structure. Siblings can be referred to by prefixing an element with a ".". Elements from the scope above can be referred to by prefixing an element with " ... ", etc.

In addition, the outer entity's top-level scope can be referred through the pseudo variable "this", which is described further below in connection with Pseudo Variables in QL.

According to embodiments, associations are represented as foreign key relationships. In the relational model, associations are mapped to foreign key relationships. The foreign key elements are usually created automatically as described in the following sections. In particular, an element with association type is represented as a nested structure type containing foreign key elements corresponding to the target entity's primary key elements—i.e. having the same names and types. The following are examples of definitions which may be given:

```
entity Employee { ...
    address1 : Association to Address;
    address2 : Association to Address { zipCode, streetAddress };
    addresses : Association to Address[0..*] via backlink owner;
}
```

In this example, the association elements would implicitly be defined with a nested structure type containing foreign key elements in the :1 cases (plus additional metadata about the association) as follows:

```
    entity Employee { ...
    address1 {
    _ID                  : type of Address._ID;
    }
    address2 {
    zipCode              : type of Address.zipCode;
    streetAddress        : type of Address.streetAddress;
    }
    addresses { /* none at all since :m */ }
}
```

Following the rules for mapping structured types to the relational model as specified above, the underlying table would be created:

```
    CREATE TABLE Employee ( ...
    "address1._ID"        Integer,
    "address2.zipCode"    String(...),
    "address2.streedAddress" String (...)
    )
```

Rules for representing associations in the persistence model may apply, as indicated in the table below:

| If ... is specified | for to-one cases, e.g. [0 ... 1] | for to-many cases |
|---|---|---|
| <no join clause> | Nested foreign key elements are created for target's primary key elements. | not allowed |
| {foreignKeys} | Nested foreign key elements are created for the elements specified in foreignKeys. | |
| VIA backlink reverseKeys | No nested foreign keys are created; instead the reverseKeys are expected to link back from target to source. | |
| VIA entity entityName | No nested foreign keys are created; instead the link table named entityName is created/used as described above. | |
| ON joinCondition | No nested foreign key elements are created; managing the foreign key relationship is completely up to the developer. | |

Consistent with the approach in SQL, no plausibility checks are enforced (e.g., checking whether target key elements specified in {foreignKeys} fulfill the uniqueness requirements). Also, no implicit referential integrity checks are enforced at runtime.

According to embodiments, associations may be in custom-defined types. As associations are special types, they can principally be defined not only for elements in entity definitions, but in type definitions in general. For example, the following definition of the association Amount.currency is valid DDL content:

```
    entity Currency {         // List of pre-defined Currencies
    key code : String(3);
    description : String(33);
    }
    type Amount {
    value : Decimal(10,2);
    currency : Association to Currency;
    }
```

An actual relationship between entities is established when using the type Amount for an element within an entity definition, as in:

```
    entity Employee {
        salary : Amount;
        address : Association to Address;
    }
```

The code shown above essentially indicates that the entity Employee has two associations—one association is to Address and another association is to Currency within its salary element.

Associations in custom-defined types may only be supported for a simple "to-one" relationship with a foreign key on the source side. That is, associations with via backlink or via entity clauses may not be supported for elements in custom-defined types.

Associations in Query Language (QL) are now discussed.
Querying Associations with :m Cardinality Resolving associations or compositions with 1:m cardinality using path expressions or nested projection clauses with the flattening operator "." in place results in flat result sets with duplicate entries for the 1: side, which is in line with standard SQL JOINs and the relational model.

As examples, in the following queries, "addresses" refers to an association with "to-many" cardinality [0 . . . *]:

```
SELECT name, addresses.city FROM Employee;
SELECT name, addresses.{ zipCode, city } FROM Employee;
```

The result sets for the example queries above, are shown below, each with the same value for name repeated/duplicated for each found entry on the :m Address side:

```
<Result Set 1> { name, city }
<Result Set 2> { name, zipCode, city }
```

Embodiments also allow the return of 'Deep' Result Sets. Specifically, in addition to the standard flattening behavior, the introduction of nested projection clauses and structured result sets principally allows expression of 'deep' queries along :m associations. These deep queries return 'real deep' result sets having the 1: sides elements on a top level, with nested tables/sets for the :m sides.

For example, the deep query:
SELECT name, addresses {zipCode, city} FROM Employee;
would be expected to return a result set with a nested collection as shown below:

```
<Result Set> {
    name,
    addresses : <collection of> Address { zipCode, city }
}
```

Such deep querying may provide certain benefits. One possible benefit is to allow retrieving larger structures through a single query.

Currently, in the absence of deep querying, such larger structures may frequently be obtained in a brute-force approach, through 1+n queries with n being the number of records returned by a 1: side query. This is detrimental to performance, particularly if such a query spans several levels of to-many associations.

While the other extensions can be realized by translating to standard SQL queries, this one requires adding special support deep within the query engine. The absence of such support may preclude using to-many associations in the non-flattened way. This is discussed further below in the associations of FROM clauses, regarding how association trees can be traversed.

Associations in WHERE Clauses

Associations can arise not only in projection clauses but also in filter conditions in WHERE clauses. Respective comparison operators may be enhanced to support associations, as depicted in the following examples:

---

1. SELECT ... from Emloyee WHERE orgunit={ _id: '4711' };
2. SELECT ... from Emloyee WHERE homeAddress={
   zipCode: '76149', streetAddress: 'Vermontring 2'
};
   3. SELECT ... from Emloyee WHERE orgunit='4711';
   4. SELECT ... from Emloyee WHERE homeAddress.city like 'Wall%';
   5. SELECT ... from Emloyee WHERE homeAddress.city IN ( 'Walldorf', ... );
   6. SELECT ... from Emloyee WHERE address IS NULL;
   7. SELECT ... from Emloyee WHERE address[kind=home].city = 'Walldorf';
   8. SELECT ... from Emloyee WHERE homeAddress = addresses[kind=home];

---

Several issues arising within the examples immediately above, may be worthy of note. In connection with:

ad 1,2: A record literal can be passed to a comparison with an association, with elements that match the combination of the foreign keys.

ad 3: Support for Association type in QL includes automatic coercions of typed scalars or string representations thereof to single-key associations.

ad 4: One can also refer to the individual key values using standard path expressions.

ad 5ff: Other SQL comparison operators can be used, such as LIKE, IN, IS NULL, . . . .

ad 8: It can be combined with XPath-like filter expressions.

ad 9: It can be combined with compare associations, provided they are assignable.

The above provides just a few examples to give the idea. In general, every condition that is possible with standard SQL expressions shall be possible to do with associations as well, including sub queries with exists and not exists, etc.

Associations in FROM Clauses

Embodiments may also allow associations in FROM clauses. Specifically, host languages may provide support for representing associations as typed variables or elements. This is described below in connection with association types in host languages.

Accordingly, one can traverse along associations, as shown in the following examples (in some pseudo language):

--- var daniel = SELECT name, homeAddress FROM Employee WHERE name='Daniel';
// ... and somewhat later, maybe at some other place in an application...
var addresses = SELECT * FROM Address WHERE this=daniel.homeAddress;

---

The expression this=<an association> can be used. The comparison this=<an association> can be retrieve an entity by a given association. The pseudo variable this is always an alias for the entity given in the FROM clause. Therefore, the statement above actually resolves to:

SELECT * FROM Address this WHERE this=daniel.homeAddress;

The comparison this=<an association> compares a queried entity with a given association—the association must be of type Association to <queried entity>[ . . . ]. This expands to a WHERE clause corresponding to the ON condition resolved from the association. In this case it would actually resolve to:

---

SELECT * FROM Address this
   WHERE this.zipCode = daniel.homeAddress.zipCode
   AND this.streetAddress = daniel.homeAddress.streetAddress
   AND this.type = 'home';

---

Embodiments may also allow the use of SELECT from association. Specifically, association-traversal code patterns like the one below are frequently seen:

SELECT * from Address WHERE this=daniel.homeAddress;

An association in general, and a programming language variable with association type support in particular, carries all information about a target record—essentially providing information as to which entity goes with which key. Thus equivalent to the query above, embodiments allow the shorthand below for traversing associations:

SELECT * from daniel.homeAddress;

In general, a query statement of the form SELECT . . . from <someAssociation> expands to:

---

SELECT ... from <someAssociation>.<targetEntity> WHERE this=<someAssociation>;

---

Here, <targetEntity> signifies the metadata associated with the association corresponding to the target entity specified in the association's declaration using the ON targetEntity clause.

JOINs Declare Ad-Hoc Associations

Embodiments allow JOINs to declare ad-hoc associations. In the case of a missing association, the standard JOIN <target> ON <join condition> clauses as introduced in SQL-92 are still supported, which align with the extensions introduced above, as they naturally introduce associations in an ad-hoc fashion.

For example, in the data model given above, the entity Employee has an association homeAddress, but is lacking a similar association for businessAddress, which can be compensated for using a standard JOIN clause as follows:

---

SELECT FROM Employee e
   ASSOCIATION TO Employee2Address e2a ON e2a.employee = e
   ASSOCIATION TO Address businessAddress ON _id = e2a.address._id AND kind=business
{
ID, name,
businessAddress { streetAddress, zipCode, city }
}

The expression may follow the syntax below:

```
JoinClause += | JOIN targetEntity [[AS] Identifier ]
    JoinConditionClauses
```

Other syntax is as discussed above in connection with associations in DDL.

JOIN clauses fit easily into the extensions in DDL and QL. JOIN clauses can be interpreted as an ad-hoc definition of missing associations.

In the example immediately above, the association businessAddress is added. This result is recognized if the projection clause of the example above, is compared to that of the query applied to the domain model if the association were in place (below):

```
SELECT FROM Employee {
    ID, name,
    businessAddress { streetAddress, zipCode, city }
}
```

Embodiments also allow the use of simplified JOIN clauses. In particular, following the observation that JOINs essentially declare ad-hoc associations, embodiments JOINs to be declared using the same clauses that are used to declare associations in DDL. Given this, the above example can be written more easily as follows:

```
SELECT FROM Employee e
    ASSOCIATION TO Address businessAddress VIA entity
    Employee2Address
    WHERE kind=business
{
ID, name,
businessAddress { streetAddress, zipCode, city }
}
```

Figure 6:
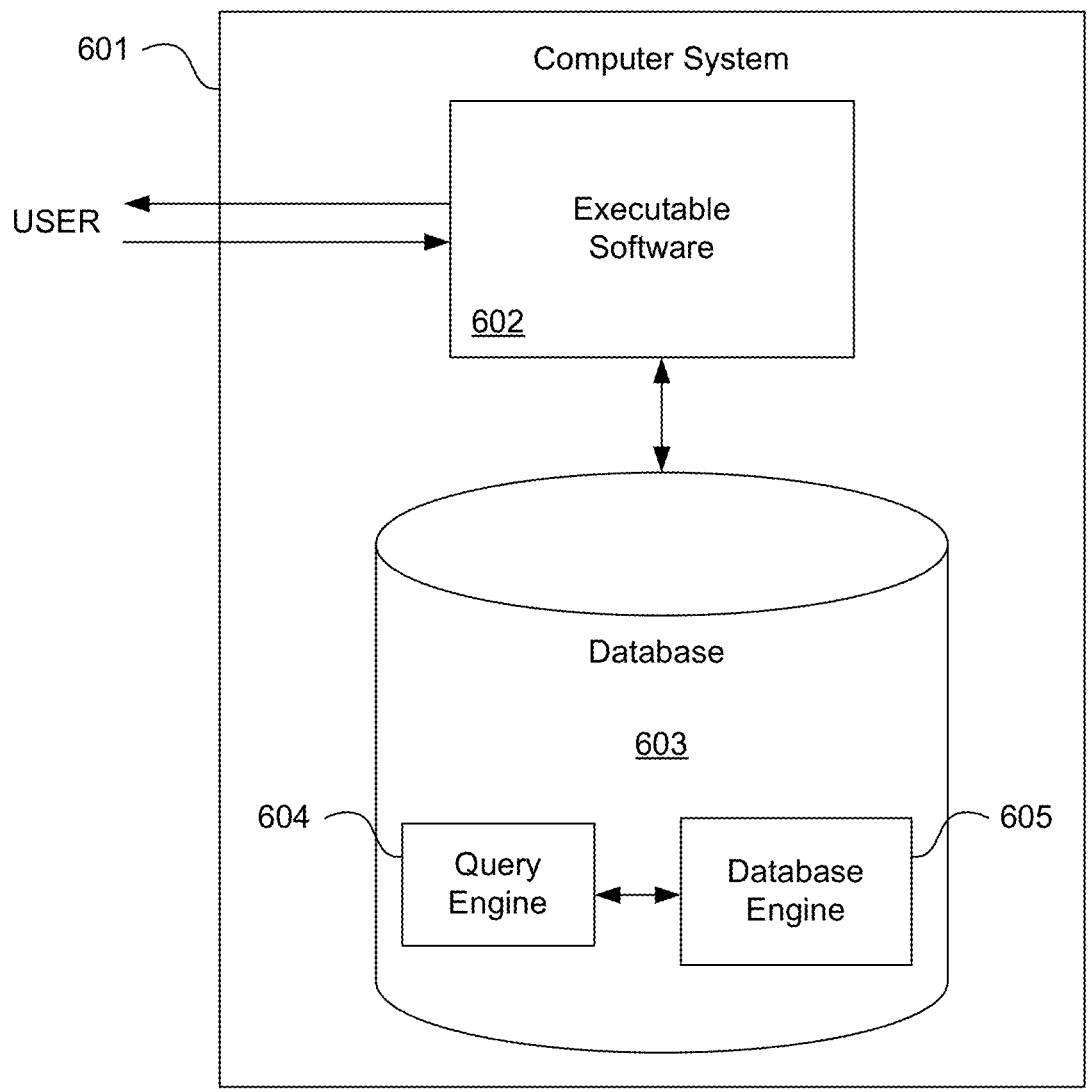
FIG. 6 illustrates hardware of a special purpose computing machine configured to extend database entity-relationship models execution, according to an embodiment.

FIG. 6 illustrates hardware of a special purpose computing machine configured to extend database entity-relationship models according to an embodiment. In particular, computer system 600 comprises a processor 602 that is in electronic communication with a non-transitory computer-readable storage medium 603. This computer-readable storage medium has stored thereon code 604 corresponding to a query engine. Code 605 corresponds to a database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
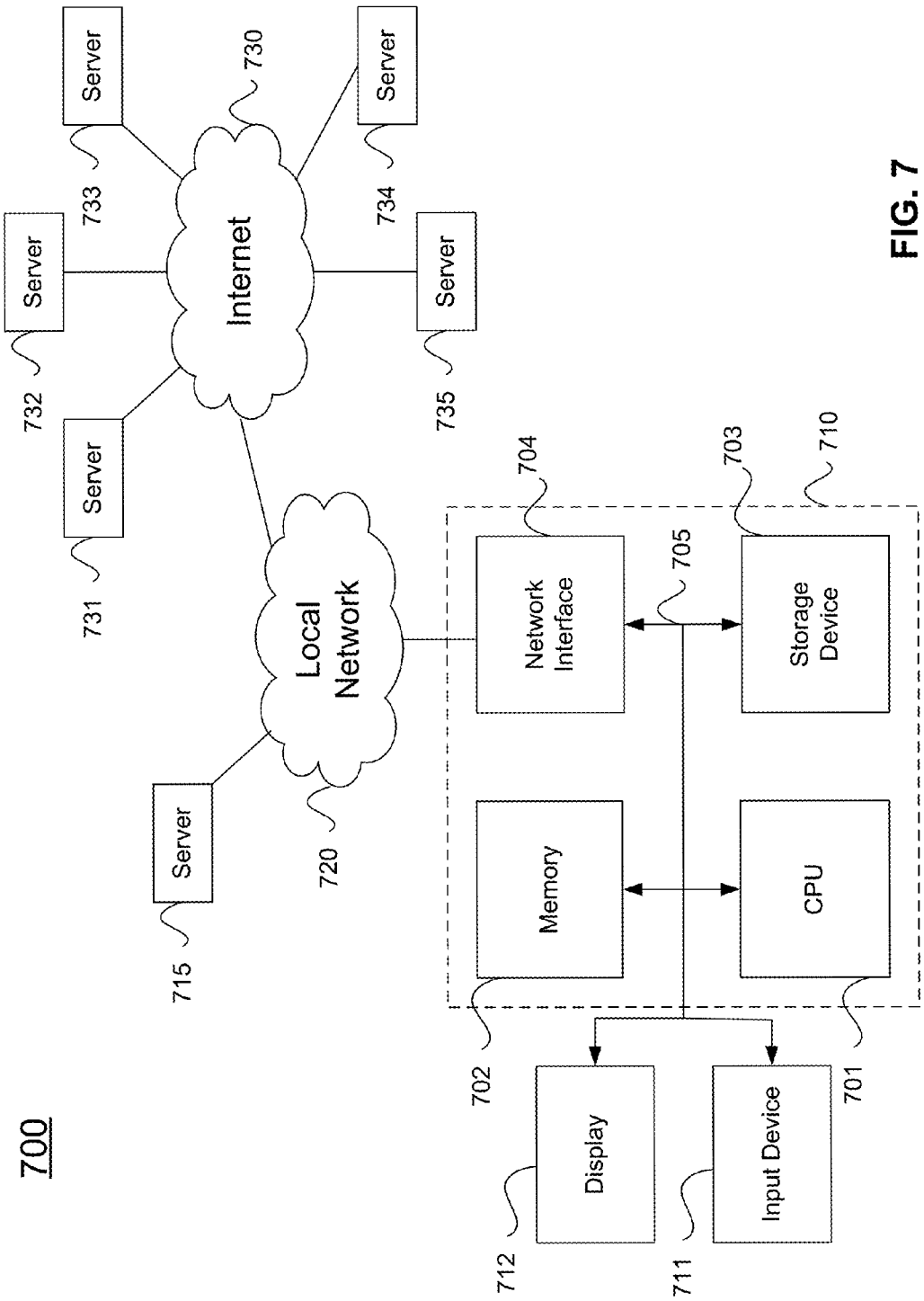
FIG. 7 illustrates an example of a computer system.

An example system 700 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system (710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving, on an in-memory database engine, a first event handler containing code configured to validate a first entity comprising an object in an in-memory database and including a constraint derived from a second entity of an Entity-Relationship Model defined by an extension of Structured Query Language to include an association type comprising a first parameter clause specifying a cardinality, and a second parameter clause specifying a foreign key, wherein an application configured to manage the in-memory database and the first event handler are in a host language different than SQL;

identifying, by the in-memory database engine and according to the first event handler, a built-in event associated with the first entity;

registering, by the in-memory database engine, the first event handler to the built-in event;

evaluating the constraint by referencing the cardinality and the foreign key, wherein the application automatically calls the first event handler when the built-in event is triggered; and wherein the in-memory database engine includes at least one service, data definition, or data processing based on an Entity-Relationship Model and at least one service, data definition, or data processing based on a Relational Model.

2. The computer-implemented method of claim 1, further comprising:

receiving, on the in-memory database engine, a second event handler configured to validate the first entity, wherein the second event handler is in the host language;

identifying, by the in-memory database engine and according to the second event handler, the built-in event associated with the first entity; and registering, by the in-memory database engine, the second event handler to the built-in event, wherein the application automatically calls the second event handler when the built-in event is triggered, and wherein the first event handler and the second event handler are executed in parallel.

3. The computer-implemented method of claim 2, wherein the first event handler and the second event handler are executed on separate threads.

4. The computer-implemented method of claim 1, wherein the calling the first event handler comprises executing the first event handler on a separate thread than the application.

5. The computer-implemented method of claim 1, wherein the built-in event is detecting that the first entity is modified.

6. The computer-implemented method of claim 1, wherein the built-in event is detecting an explicit call to the built-in event.

7. The computer-implemented method of claim 6, wherein the explicit call is a built-in validate action belonging to the first entity.

8. A non-transitory computer readable storage medium storing one or more programs, the one or more programs comprising instructions for:

receiving, on an in-memory database engine, a first event handler containing code configured to validate a first entity comprising an object in an in-memory database and including a constraint derived from a second entity of an Entity-Relationship Model defined by an extension of Structured Query Language (SQL) Language to include an association type comprising a first parameter clause specifying a cardinality, and a second parameter clause specifying a foreign key, wherein an application configured to manage the in-memory database and the first event handler are in a host language different than SQL;

identifying, by the in-memory database engine and according to the first event handler, a built-in event associated with the first entity; and registering, by the in-memory database engine, the first event handler to the built-in event;

evaluating the constraint by referencing the cardinality and the foreign key, wherein the application automatically calls the first event handler when the built-in event is triggered; and wherein the in-memory database engine includes at least one service, data definition, or data processing based on an Entity-Relationship Model and at least one service, data definition, or data processing based on a Relational Model.

9. The non-transitory computer readable storage medium of claim 8, further comprising:

receiving, on the in-memory database engine, a second event handler configured to validate the first entity, wherein the second event handler is in the host language;

identifying, by the in-memory database engine and according to the second event handler, the built-in event associated with the first entity; and registering, by the in-memory database engine, the second event handler to the built-in event, wherein the application automatically calls the second event handler when the built-in event is triggered, and wherein the first event handler and the second event handler are executed in parallel.

10. The non-transitory computer readable storage medium of claim 9, wherein the first event handler and the second event handler are executed on separate threads.

11. The non-transitory computer readable storage medium as in claim 8, wherein the calling the first event handler comprises executing the first event handler on a separate thread than the application.

12. The non-transitory computer readable storage medium of claim 8, wherein the built-in event is detecting that the first entity is modified.

13. The non-transitory computer readable storage medium of claim 8, wherein the built-in event is detecting an explicit call to the built-in event.

14. The non-transitory computer readable storage medium of claim 13, wherein the explicit call is a built-in validate action belonging to the first entity.

15. A computer system comprising:

ail in-memory database engine; and a non-transitory computer readable medium having stored thereon one or more programs, which when executed by the in-memory database engine, causes the in-memory database engine to:

receive a first event handler containing code configured to validate a first entity comprising an object in an in-memory database including a constraint derived from a second entity of an Entity-Relationship Model defined by an extension of Structured Query Language (SQL) Language to include an association type comprising a first parameter clause specifying a cardinality, and a second parameter clause specifying a foreign key, wherein an application configured to manage the in-memory database and the first event handler are in a host language different than SQL;

identify according to the first event handler, a built-in event associated with the first entity;

register the first event handler to the built-in event; and evaluate the constraint by referencing the cardinality and the foreign key, wherein the application automatically calls the first event handler when the built-in event is triggered; and wherein the in-memory database engine includes at least one service data definition, or data processing based on an Entity-Relationship Model and at least one service, data definition, or data processing based on a Relational Model.

16. The computer system of claim 15, wherein the one or more programs, which when executed by the in-memory database engine, further cause the in-memory database engine to:
receive a second event handler configured to validate the first entity, wherein the second event handler is in the host language;
identify according to the second event handler, the built-in event associated with the first entity; and
register the second event handler to the built-in event, wherein the application automatically calls the second event handler when the built-in event is triggered, and wherein the first event handler and the second event handler are executed in parallel.

17. The computer system of claim 16, wherein the first event handler and the second event handler are executed on separate threads.

18. The computer system of claim 15, wherein the calling the first event handler comprises executing the first event handler on a separate thread than the application.

19. The computer system of claim 15, wherein the built-in event is detecting that the first entity is modified.

20. The computer system of claim 15, wherein the built-in event is detecting an explicit call to the built-in event.

* * * * *